(12) United States Patent
Barnett et al.

(10) Patent No.: US 7,647,755 B2
(45) Date of Patent: Jan. 19, 2010

(54) ADJUSTMENT OF THE HITCH ARM OF A PULL-TYPE CROP HARVESTING MACHINE

(75) Inventors: Neil Gordon Barnett, Winnipeg (CA); Geoffrey U. Snider, Winnnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 719 days.

(21) Appl. No.: 11/188,133

(22) Filed: Jul. 25, 2005

(65) Prior Publication Data

US 2007/0029099 A1    Feb. 8, 2007

(51) Int. Cl.
*A01D 34/00* (2006.01)

(52) U.S. Cl. .................... 56/14.9; 172/324; 172/328

(58) Field of Classification Search .................... 92/168, 92/255, 23, 26, 161; 188/300, 285, 282.7; 172/324, 328; 56/14.9
See application file for complete search history.

(56) References Cited

U.S. PATENT DOCUMENTS

| | | | | | |
|---|---|---|---|---|---|
| 2,178,073 | A | * | 10/1939 | Hardy | 280/773 |
| 2,182,581 | A | * | 12/1939 | Casper | 188/282.7 |
| 2,606,414 | A | * | 8/1952 | Dyrr | 180/14.1 |
| 3,543,643 | A | * | 12/1970 | Southwell | 91/401 |
| 3,658,297 | A | * | 4/1972 | Banks, Jr. | 254/93 R |
| 4,089,253 | A | * | 5/1978 | Visser | 92/168 |
| 4,312,264 | A | * | 1/1982 | Nunnemacher et al. | 92/161 |
| 4,368,609 | A | * | 1/1983 | Hutchinson et al. | 56/221 |
| 4,433,011 | A | * | 2/1984 | Larson et al. | 427/231 |
| RE32,262 | E | * | 10/1986 | Stewart | 296/171 |
| 5,026,246 | A | * | 6/1991 | Bay et al. | 414/694 |
| 5,727,445 | A | * | 3/1998 | Sheldon | 92/2 |
| 6,659,192 | B2 | * | 12/2003 | Coenen et al. | 172/439 |
| 6,817,278 | B2 | * | 11/2004 | Hennemann et al. | 92/255 |

* cited by examiner

*Primary Examiner*—Árpád Fábián-Kovács
(74) *Attorney, Agent, or Firm*—Adrian D. Battison; Ade & Company Inc.

(57) ABSTRACT

A pull-type crop harvesting machine has a header carried on a frame mounted on ground wheels with a hitch arm extending from the frame over the header to a hitch coupling of a tractor. The hitch arm is mounted for pivotal movement about a generally upright axis such that in a first position the tractor tows the frame in echelon to one side and in a second position the tractor tows the frame in echelon. The movement is actuated by a hydraulic cylinder and stopped at one end of the movement by the piston with a rod coupling being adjustably mounted on the rod to adjust the end position. At the other end of the movement, the position is defined by a stop member mounted on the piston rod and adjustable relative thereto. Each end of the cylinder includes a cushion effect by using separate orifices for the fluid ports which slow fluid flow as the piston approaches the ends of the cylinder.

12 Claims, 2 Drawing Sheets

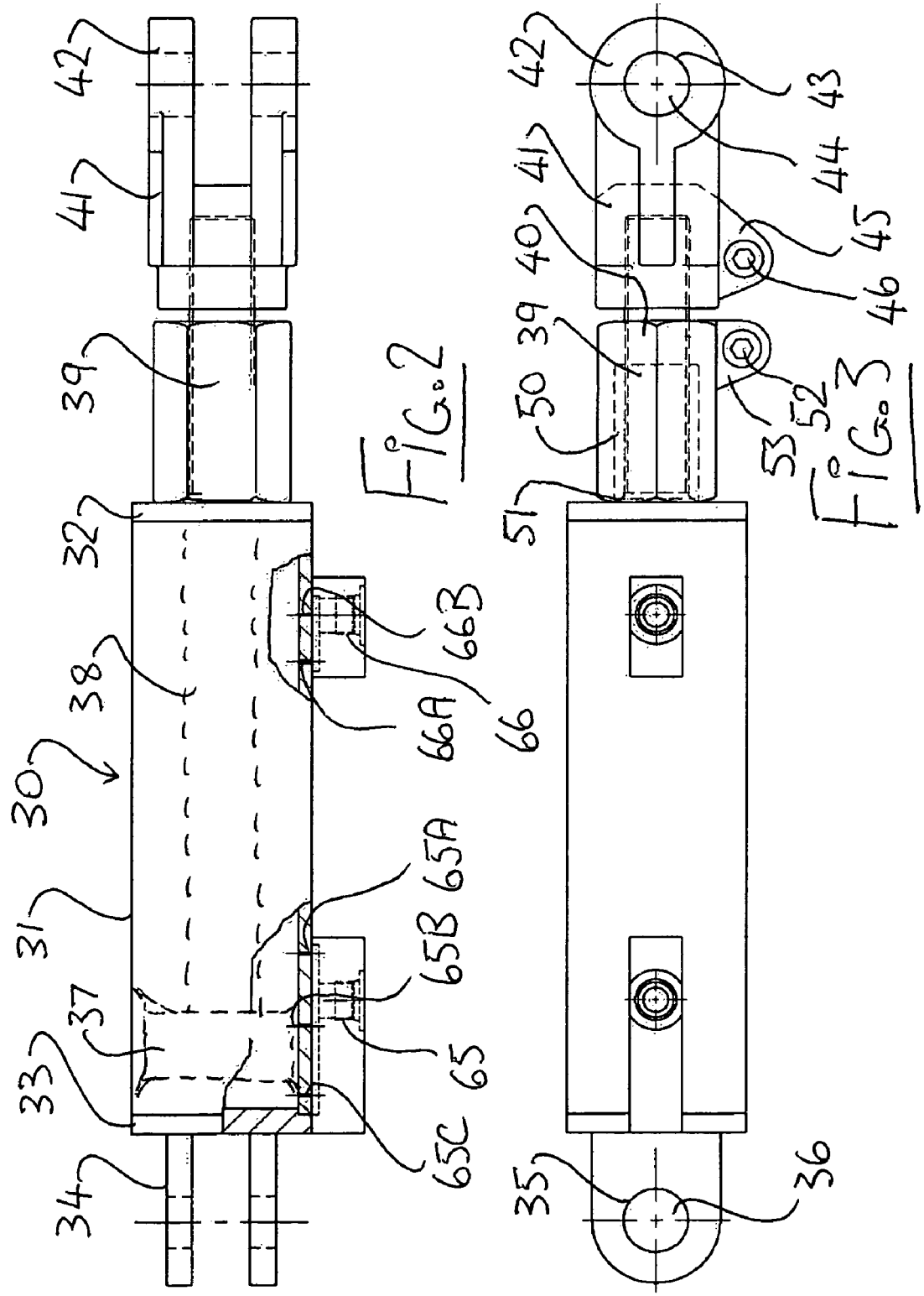

ADJUSTMENT OF THE HITCH ARM OF A PULL-TYPE CROP HARVESTING MACHINE

This invention relates to a pull-type crop harvesting machine of the type including a header carried on a frame to be towed behind a tractor and particularly to a cylinder arrangement for adjusting the position of the hitch arm relative to the frame of the machine.

BACKGROUND OF THE INVENTION

Pull type harvesting machines are towed from the tractor by a hitch arm which requires to be adjusted in angle relative to the frame of the machine for fine steering movements and more coarse movement to the transport position.

Some machines are required to follow the tractor only to one side and thus include a hitch arm which is located at one end of the machine. In others in which the present invention is particularly effective, the hitch arm to the tractor extends from the frame over the header to a hitch coupling and can be swung by an operating cylinder from one side of the header to the other so that the header can be located in echelon with the tractor to one side of symmetrically to the other side.

Pull-type harvesting machines of this type are well known and there are many different examples manufactured by a number of different companies. One problem which has arisen with many different designs is that of controlling the movement of the machine from one side of the tractor to the other side of the tractor. It will be appreciated that the machine applies significant loads to the hitch arm from the significant amount of weight which is moved across behind the tractor by actuating a cylinder which pushes the hitch arm to one side or the other as required to transfer the machine to the required echelon position. Conventionally heavy stops are provided on the mechanical elements, that is on the frame or the hitch arm or on both so as to locate the machine at the required position. As the machine moves across, impact on this stop can incur significant forces against the stop so that the mechanical elements involved must be built with these forces in mind and thus must be stronger than might otherwise be required.

In addition it is desirable that there be provided an ability to adjust the stop member so that the echelon position can be accurately located. If the stop is incorrectly positioned, the header may be located either too far away from the tractor, in which case a strip of crop material may be missed during the harvesting action or to close to the tractor, in which case the maximum operating width of the header is not fully utilized. If either of these conditions occurs, it is necessary for operator to steer the machine by moving the cylinder away from the end stop. This is tiring for the operator and causes the machine to return the end stop more frequently with the possibility of further damage.

SUMMARY OF THE INVENTION

It is one object of the invention to provide an improved machine of the above type.

According to one aspect of the invention there is provided a pull-type crop harvesting machine comprising:

a frame mounted on ground wheels for movement across ground carrying a standing crop for harvesting;

a header mounted across a front of the frame so that the frame carries the header into the standing crop for cutting the standing crop and converging the cut crop into a crop discharge;

a hitch arm extending from the frame over the header to a forward end of the hitch arm arranged for attachment to a hitch coupling of a tractor by which the frame and the header are towed across the ground;

the hitch arm being connected to the frame for pivotal movement about a generally upright axis so as to be movable between a first operating position forwardly from the frame and inclined outwardly to a first side and a second operating position forwardly from the frame and inclined outwardly to a second side opposite to the first side, such that in the first position the tractor tows the frame in echelon to one side and in the second position the tractor tows the frame in echelon to the other side and such that there is provided a central position in which the hitch arm extends rearwardly from the tractor to tow the frame behind the tractor in a transport position;

and a hydraulic cylinder for actuating movement of the hitch arm relative to the frame between the first and second positions, the cylinder comprising:

a cylinder body;

a piston slidable within the cylinder body a piston rod projecting from a first end of the cylinder body;

a cylinder coupling at a second end of the cylinder body for connection to one of the hitch arm and the frame;

a rod coupling at an outer end of the piston rod for connection to the other of the hitch arm and the frame such that movement of the piston in the cylinder body causes said movement of the hitch arm relative to the frame;

a first entry port adjacent the second end of the cylinder body for supplying hydraulic fluid to the cylinder body on a side of the piston to drive the piston to the first end of the cylinder body;

a second entry port adjacent the first end of the cylinder body for supplying hydraulic fluid to the cylinder body on a side of the piston to drive the piston to the second end of the cylinder body;

the rod coupling being adjustably mounted on the rod such that the position of the coupling on the rod can be moved to change the distance of the piston from the rod coupling and thus to change the position of the rod coupling relative to the cylinder coupling when the piston reaches the first end of the cylinder body;

and a stop member mounted on the piston rod for engaging the first end of the cylinder body when the piston approaches the second end of the cylinder body, the position of the stop member on the piston rod being adjustable so as to change the position of the rod coupling relative to the cylinder coupling when the stop member reaches the first end of the cylinder body;

the hitch arm and the frame being arranged such that the first and the second operating positions are defined by the piston and the stop member reaching the first end of the cylinder body.

The cylinder may be connected with the cylinder coupling connected to the frame and the rod coupling connected to the hitch arm or vice versa.

Preferably the piston rod is threaded with a male thread and wherein the rod coupling and the stop member each include a female threaded portion such that the position of the rod coupling is adjusted by rotating the rod coupling relative to the piston rod and such that the position of the stop member is adjusted by rotating the stop member relative to the piston rod. Both the rod coupling and the stop member can be clamped into the adjusted position by a screw which clamps the member onto the rod to prevent the adjustment rotation.

Preferably the second entry port includes at least two orifices where one of the orifices is spaced further from the first end of the cylinder body than another of the orifices such that a rate of flow of hydraulic fluid from the cylinder body out of the first entry port decreases as the piston approaches the first end of the cylinder body.

Preferably said one of the orifices is larger than said other of the orifices such that the rate of flow of the hydraulic fluid is reduced to less than 50% to significantly slow the movement of the piston as it reaches the first end of the cylinder body.

Preferably also the first entry port includes at least two orifices where one of the orifices is spaced further from the second end of the cylinder body than another of the orifices such that a rate of flow of hydraulic fluid from the cylinder body out of the first entry port decreases as the piston approaches the second end of the cylinder body.

Preferably the first entry port includes more than two orifices arranged at spaced positions from the second end of the cylinder body.

According to a second aspect of the invention there is provided a pull-type crop harvesting machine comprising:

a frame mounted on ground wheels for movement across ground carrying a standing crop for harvesting;

a header mounted across a front of the frame so that the frame carries the header into the standing crop for cutting the standing crop and converging the cut crop into a crop discharge;

a hitch arm extending from the frame to a forward end of the hitch arm arranged for attachment to a hitch coupling of a tractor by which the frame and the header are towed across the ground;

the hitch arm being connected to the frame for pivotal movement about a generally upright axis so as to be movable between a first position and a second position;

and a hydraulic cylinder for actuating movement of the hitch arm relative to the frame between the first and second positions, the cylinder comprising:

a cylinder body;

a piston slidable within the cylinder body a piston rod projecting from a first end of the cylinder body;

a cylinder coupling at a second end of the cylinder body for connection to one of the hitch arm and the frame;

a rod coupling at an outer end of the piston rod for connection to the other of the hitch arm and the frame such that movement of the piston in the cylinder body causes said movement of the hitch arm relative to the frame;

a first port adjacent the second end of the cylinder body for supplying hydraulic fluid to the cylinder body on a side of the piston to drive the piston to the first end of the cylinder body;

a second port adjacent the first end of the cylinder body for supplying hydraulic fluid to the cylinder body on a side of the piston to drive the piston to the second end of the cylinder body;

wherein at least one of the ports includes at least two orifices where one of the orifices is spaced further from the first end of the cylinder body than another of the orifices such that a rate of flow of hydraulic fluid from the cylinder body into the port decreases as the piston approaches the end of the cylinder body.

BRIEF DESCRIPTION OF THE DRAWINGS

One embodiment of the invention will now be described in conjunction with the accompanying drawings in which:

FIG. 2 is a side elevation view of the cylinder of FIG. 1 showing parts in cross section.

FIG. 3 is a top plan view of the cylinder of FIG. 2 showing some parts in phantom.

In the drawings like characters of reference indicate corresponding parts in the different figures.

DETAILED DESCRIPTION

Figure 1:
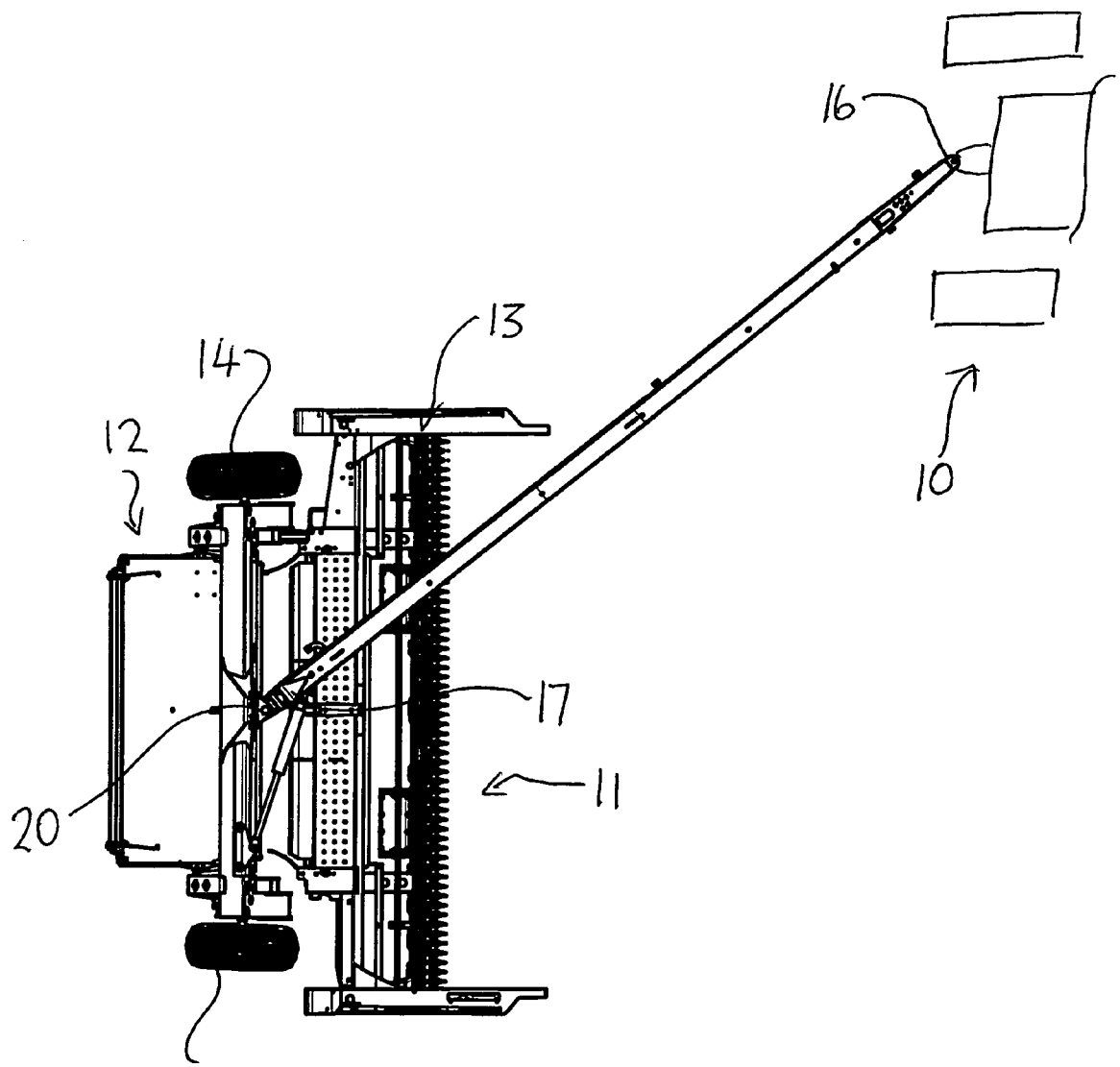
FIG. 1 is a top plan view of a harvesting machine according to the present invention showing the arrangement of the cylinder which connects the frame to the hitch arm.

In FIG. 1 is shown a tractor 10 which tows in echelon a pull-type harvesting machine 11. The harvesting machine includes a frame 12 and a header 13 carried on the frame. The frame is mounted on ground wheels 14 and 15. The construction of the frame and the construction of the header are well known to one skilled in this art so that further details of these arrangements will not be shown nor described herein.

In some embodiments of the invention, the hitch can be located at one end of the frame. It is also well known that such arrangements, as shown in FIG. 1, include a hitch arm 15 which extends from a hitch coupling 16 at the rear of the tractor and inclined manner rearwardly and outwardly to one side of the tractor to a coupling 17 at the center of the frame of the machine generally midway between the wheels 14 and 15.

It will be appreciated that movement of the hitch arm relative to the frame, from the position shown in FIG. 1 to a symmetrically opposite position (not shown) will carry the harvesting machine 11 from its position in echelon to one side to a corresponding position in echelon to the other side. In between, would be the header directly behind the tractor, a transport position can be provided.

The hitch are 15 connects to the frame 12 at a pivot pin 20 which defines a substantially vertical fixed pivot access so that the orientation of the machine relative to the ground is fixed by the position of the pin which is held by the angle of the arm.

The position of the arm relative to the frame is adjusted by a cylinder 30. The cylinder 30 includes a cylinder body 31 which has a first end 32 and a second end 33. A cylinder coupling 34 is connected at the second end 33 so that it is fixed to the end 33. The cylinder coupling is in the form of clevis defined by two plates forming a hole 35 which is attached to a pin 36 fixed to the frame. Within the cylinder body is provided piston 37 which can slide along the interior of the cylinder body and carries a piston rod 38 which projects through the end 32 to an end portion 39 of the piston rod exposed beyond the first end 32 of the cylinder body. The piston rod includes a threaded section 40 at its outer end. Supported on the outer end is a rod coupling 41 which defines a clevis 42 formed by two plates defining a hole 43 attached to a pin 44 on the hitch arm. The rod coupling 41 can be adjusted in position along the length of the threaded section of the piston rod by rotation of the coupling 41 relative to the piston rod. This rotation is allowed when the clamping action of a clamp 45 is released by releasing a bolt 46 on that clamp. Thus when the clamp is opened, the rotation of the rod coupling relative to the rod causes the rod coupling to move along the thread the an adjusted position as required.

Relatively rotational movement of the coupling 41 relative to the rod can be achieved by either releasing the pin 44 or by grasping the piston rod and rotating the piston rod within the cylinder.

A stop member 50 is provided which has an end face 51 which butts against the end 32 of the cylinder body. This stop member therefore locates the movement of the piston rod in the direction toward the second end 33. The stop member 50 is also clamped onto the piston rod but can be released by unfastening a bolt 52 releasing the clamp 53 so that the threaded section of the stop member can be moved along the threaded section of the rod to a required position of a stop member.

Rotation of the piston rod relative to the rod coupling can be effected by rotating the stop member 50 with the clamp 53 engaged. Rotation of the piston rod relative to the stop member can be obtained by rotating the stop member while the piston rod is held fixed by the clamp member 45 of the rod coupling.

In this way the length of the cylinder when extended, that is the distance between the hole 35 of the cylinder coupling and the hole 43 of the rod coupling in the extended position is controlled by the piston 37 butting the end 32 and by adjustment of the length of the portion of the piston rod between the rod coupling and the piston.

Thus the length of the cylinder, that is the difference between the hole 35 and the hole 43 in the retracted position of the cylinder is controlled by the stop member 50 butting against the end 32 and by adjusting the stop member relative to the piston rod.

In this way the ends of the movement of the hitch arm relative to the frame are controlled, not by stops on the hitch arm and/or the frame but instead by the adjustment of the cylinder itself.

In order to provide a reduction in the impact forces at the ends of the stroke of the cylinder, the cylinder is ported by two ports 65 and 66, each of which includes a plurality of orifices. Thus the second port 66 adjacent the first end 32 of the cylinder body includes two orifices 66A and 66B connected by a channel 66C. The orifice 66A is spaced further from the end 32 and as is the orifice 66B. The orifice 66A is larger than the orifice 66B. Thus as the piston 37 approaches the first end 42 with fluid from the cylinder body on that side of the piston flowing out of the port 66, when the piston covers the orifice 66A, the flow through the orifice is closed off leaving only the orifice 66B for the fluid to escape to the port 66. Thus the rate of flow is dramatically decreased as the orifice 66A is covered so that the rate of movement of a piston toward the first end 32 also dramatically slows thus producing a "cushioned" approach or "soft landing" thus reducing the impact of the piston on the end 32.

Similarly the port 65 includes three orifices 65A, 65B and 65C at spaced positions along the cylinder body. Three orifices are provided at this end so as to allow an increased distance of adjustment of the stop member to accommodate different widths of the header used with the frame. Thus the stop member 39 is adjusted not only for the fine adjustment for particular header but also provides a courser adjustment to accommodate different widths of header on the same frame. The course and fine adjustments are effected similarly by rotation of the stop member relative to the piston rod. Basically the piston need to be long enough and have an effective seal at each end so that in this way the ports get covered and the oil cannot bypass the piston as the cylinder closes. For the shorter header that requires a shorter swing and less compression only the first orifice gets covered and reduces flow to cushion the cylinder before it hits its stops. For the longer header the cushioning happens in two stages since first one and then the next orifice gets covered. It is possible to use a two orifice system but then the longer header can slow too much in the long cushioning zone.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pull-type crop harvesting machine comprising:
   a frame mounted on ground wheels for movement across ground carrying a standing crop for harvesting;
   a header mounted across a front of the frame so that the frame carries the header into the standing crop for cutting the standing crop and converging the cut crop into a crop discharge;
   a hitch arm extending from the frame to a forward end of the hitch arm arranged for attachment to a hitch coupling of a tractor by which the frame and the header are towed across the ground;
   the hitch arm being connected to the frame by a pivot coupling arranged to provide pivotal movement about a generally upright axis so that the hitch arm is movable between a first position and a second position;
   and a hydraulic cylinder connected so as to actuate movement of the hitch arm relative to the frame between the first and second positions, the cylinder comprising:
   a cylinder body;
   a piston slidable within the cylinder body;
   a piston rod projecting from a first end of the cylinder body;
   a cylinder coupling at a second end of the cylinder body connected to one of the hitch arm and the frame;
   a rod coupling at an outer end of the piston rod connected to the other of the hitch arm and the frame such that movement of the piston in the cylinder body causes said movement of the hitch arm relative to the frame
   a first port arrangement adjacent the second end of the cylinder body connected to a first hydraulic supply line such that hydraulic fluid supplied through the first hydraulic supply line is communicated to the cylinder body through the first port arrangement on a side of the piston to drive the piston to the first end of the cylinder body;
   a second port arrangement adjacent the first end of the cylinder body connected to a second hydraulic supply line such that hydraulic fluid supplied through the second hydraulic supply line is communicated to the cylinder body through the second port arrangement on a side of the piston to drive the piston to the second end of the cylinder body;
   the rod coupling being adjustably mounted on the rod such that the position of the rod coupling on the rod can be moved to change the distance of the piston from the rod coupling and thus to change the position of the rod coupling relative to the cylinder coupling when the piston reaches the first end of the cylinder body;
   and a stop member mounted on the piston rod and arranged to engage the first end of the cylinder body when the piston approaches the second end of the cylinder body, the position of the stop member on the piston rod being adjustable independently of the rod coupling so as to change the position of the rod coupling relative to the cylinder coupling when the stop member reaches the first end of the cylinder body;
   the hitch arm and the frame being arranged such that the first position of the hitch arm is defined by the piston reaching the first end of the cylinder body and such that the second position of the hitch arm is defined by the stop member reaching the first end of the cylinder body.

2. The harvesting machine according to claim 1 wherein the hitch arm is connected to the frame for pivotal movement about a generally upright axis so as to be movable between the first position forwardly from the frame and inclined outwardly to a first side and the second position forwardly from the frame and inclined outwardly to a second side opposite to the first side, such that in the first position the tractor tows the frame in echelon to one side and in the second position the tractor tows the frame in echelon to the other side and such that there is provided a central position in which the hitch arm extends rearwardly from the tractor to tow the frame behind the tractor in a transport position.

3. The harvesting machine according to claim 1 wherein the piston rod is threaded with a male thread and wherein the rod coupling and the stop member each include a female threaded portion such that the position of the rod coupling is adjusted by rotating the rod coupling relative to the piston rod and such that the position of the stop member is adjusted independently of the rod coupling by rotating the stop member relative to the piston rod.

4. The harvesting machine according to claim 1 wherein the second entry port arrangement includes at least two orifices each orifice communicating from the second hydraulic supply line separately with the cylinder body where one of the orifices is spaced along the cylinder body further from the first end of the cylinder body than another of the orifices such that a rate of flow of hydraulic fluid into the cylinder body from the first entry pod arrangement decreases as the piston approaches the first end of the cylinder body and thus closes said one of the orifices leaving the hydraulic fluid flowing through said another of the orifices.

5. The harvesting machine according to claim 4 wherein the first entry pod arrangement includes at least two orifices each communicating from the first hydraulic supply line separately with the cylinder body where one of the orifices is spaced further along the cylinder body from the second end of the cylinder body than another of the orifices such that a rate of flow of hydraulic fluid into the cylinder body from the first entry port decreases as the piston approaches the second end of the cylinder body and thus closes said one of the orifices leaving the hydraulic fluid flowing through said another of the orifices.

6. The harvesting machine according to claim 4 wherein said one of the orifices of said second entry port arrangement is larger than said other of the orifices of said second entry port arrangement.

7. The harvesting machine according to claim 5 wherein the first entry port arrangement includes more than two orifices arranged at spaced positions along the cylinder body from the second end of the cylinder body.

8. A pull-type crop harvesting machine comprising:
a frame mounted on ground wheels for movement across ground carrying a standing crop for harvesting;
a header mounted across a front of the frame so that the frame carries the header into the standing crop for cuffing the standing crop and converging the cut crop into a crop discharge;
a hitch arm extending from the frame to a forward end of the hitch arm arranged for attachment to a hitch coupling of a tractor by which the frame and the header are towed across the ground;
the hitch arm being connected to the frame by a pivot coupling arranged to provide pivotal movement about a generally upright axis so that the hitch arm is movable between a first position and a second position;
and a hydraulic cylinder connected so as to actuate movement of the hitch arm relative to the frame between the first and second positions, the cylinder comprising:
a cylinder body;
a piston slidable within the cylinder body;
a piston rod projecting from a first end of the cylinder body;
a cylinder coupling at a second end of the cylinder body connected to one of the hitch arm and the frame;
a rod coupling at an outer end of the piston rod connected to the other of the hitch arm and the frame such that movement of the piston in the cylinder body causes said movement of the hitch arm relative to the frame;
a first port arrangement adjacent the second end of the cylinder body connected to a first hydraulic supply line such that hydraulic fluid supplied through the first hydraulic supply line is communicated to the cylinder body through the first port arrangement on a side of the piston to drive the piston to the first end of the cylinder body;
a second port arrangement adjacent the first end of the cylinder body connected to a second hydraulic supply line such that hydraulic fluid supplied through the second hydraulic supply line is communicated to the cylinder body through the second port arrangement on a side of the piston to drive the piston to the second end of the cylinder body;
wherein at least one of the first and second port arrangements includes at least two orifices each orifice communicating from the respective one of the first and second hydraulic supply lines separately with the cylinder body where one of the orifices is spaced along the cylinder body further from the first end of the cylinder body than another of the orifices such that a rate of flow of hydraulic fluid from the cylinder body into the port arrangement decreases as the piston approaches the end of the cylinder body and thus closes said one of the orifices leaving the hydraulic fluid flowing through said another of the orifices.

9. The harvesting machine according to claim 8 wherein each of the first port arrangement and second port arrangement includes at least two orifices each orifice communicating from the respective one of the first and second hydraulic supply lines separately with the cylinder body where one of the orifices is spaced further along the cylinder body from the second end of the cylinder body than another of the orifices such that a rate of flow of hydraulic fluid from the cylinder body to the port decreases as the piston approaches the respective one of the first and second ends of the cylinder body and thus closes said one of the orifices leaving the hydraulic fluid flowing through said another of the orifices.

10. The harvesting machine according to claim 8 wherein the hitch arm is connected to the frame for pivotal movement about a generally upright axis so as to be movable between the first position forwardly from the frame and inclined outwardly to a first side and the second position forwardly from the frame and inclined outwardly to a second side opposite to the first side, such that in the first position the tractor tows the frame in echelon to one side and in the second position the tractor tows the frame in echelon to the other side and such that there is provided a central position in which the hitch arm extends rearwardly from the tractor to tow the frame behind the tractor in a transport position.

11. The harvesting machine according to claim 8 wherein said one of the orifices of the second port arrangement is larger than said other of the orifices of the second port arrangement.

12. The harvesting machine according to claim 8 wherein the first port arrangement includes more than two orifices arranged at spaced positions along the cylinder body from the second end of the cylinder body.

* * * * *